B. ARMSTRONG.
HOG DISINFECTANT SPRINKLER.
APPLICATION FILED JULY 1, 1915.
1,189,523.
Patented July 4, 1916.
2 SHEETS—SHEET 1.
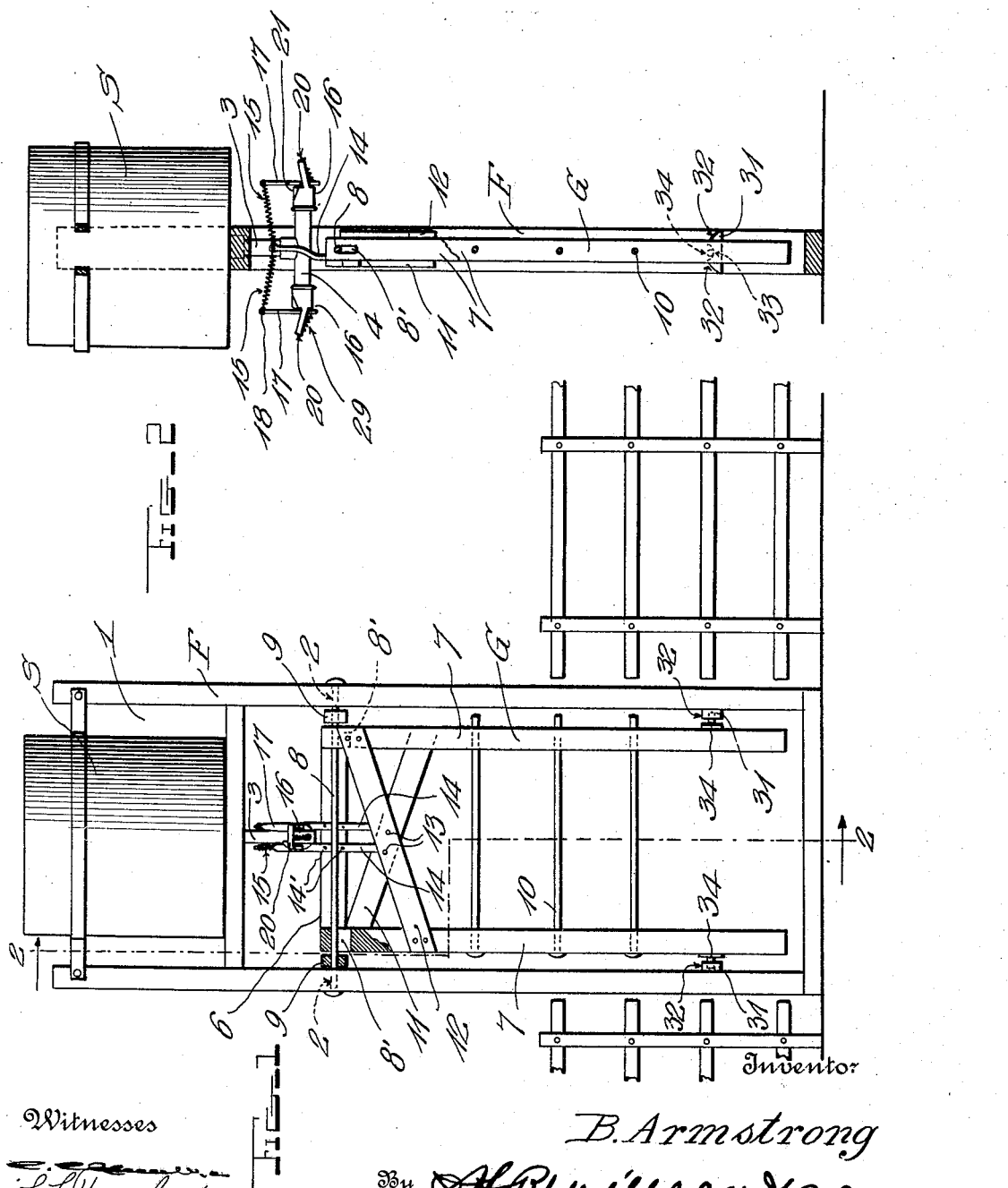
Witnesses
L. L. Townshend
Inventor
B. Armstrong
By H. B. Willson & Co.
Attorneys

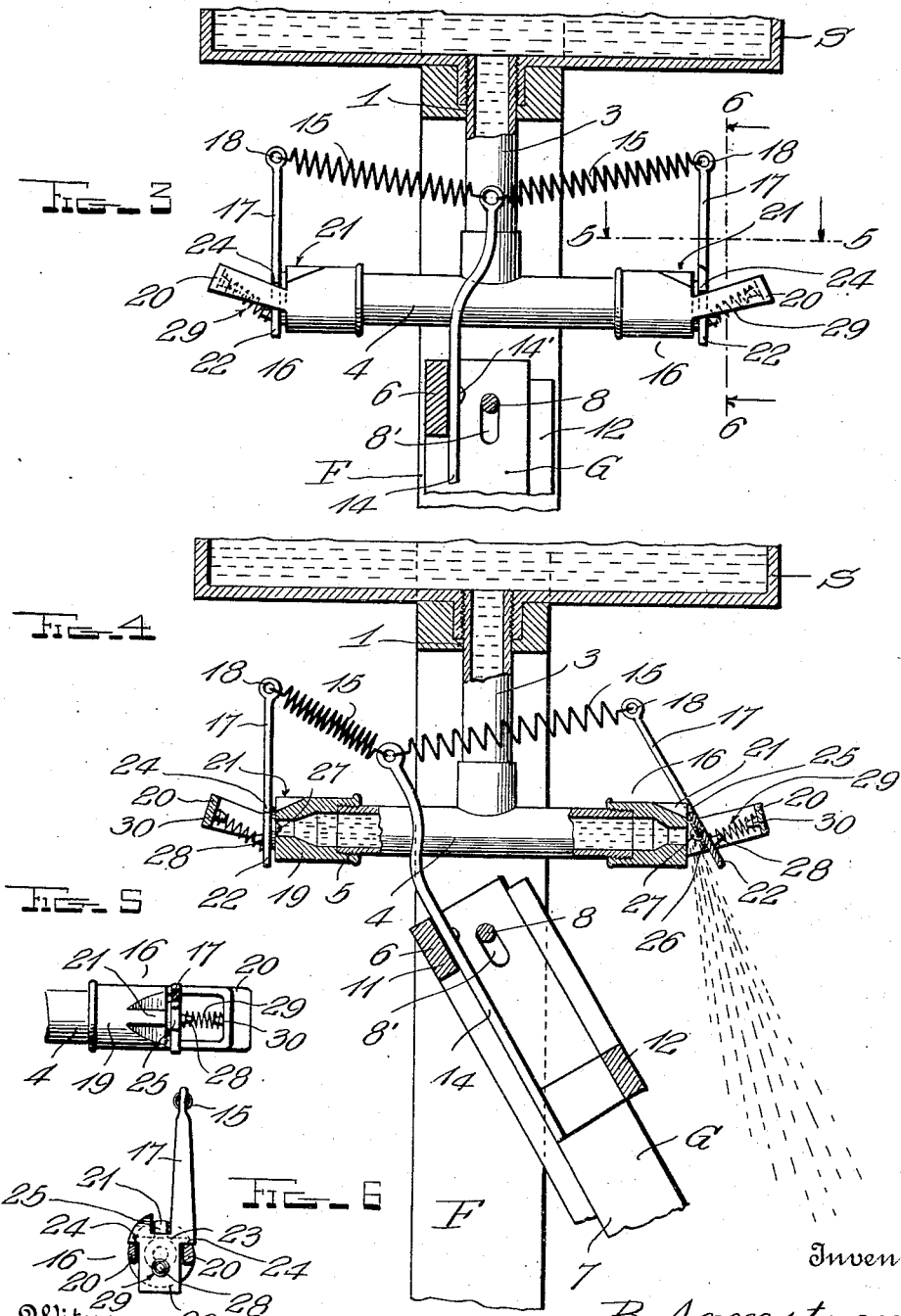

UNITED STATES PATENT OFFICE.

BERT ARMSTRONG, OF SEATON, ILLINOIS.

HOG-DISINFECTANT SPRINKLER.

1,189,523.  Specification of Letters Patent.  Patented July 4, 1916.

Application filed July 1, 1915. Serial No. 37,489.

*To all whom it may concern:*

Be it known that I, BERT ARMSTRONG, a citizen of the United States, residing at Seaton, in the county of Mercer and State of Illinois, have invented certain new and useful Improvements in Hog-Disinfectant Sprinklers; and I do declare the following to be a full, clear, and exact description of the invention, such as will enable others skilled in the art to which it appertains to make and use the same.

This invention relates to new and useful improvements in spraying devices for stock such as hogs, sheep, or the like, so arranged that the stock may automatically operate the sprayer for causing a spray of disinfectant, insecticide, or the like, to play upon the stock.

It is the object of this invention to provide a new and improved automatic sprayer adapted to be operated by the stock in passing thereunder from either direction.

A further object of the invention is to provide a device which is simple and durable in construction, inexpensive to manufacture, and one which will be very efficient in operation.

With these and numerous other objects in view, my invention consists of certain novel features of construction, combination and arrangement of parts, which will be hereinafter referred to and more fully pointed out in the specification and claims.

In the accompanying drawings: Figure 1 is a side elevation partly in section showing my improved device in position; Fig. 2 is a vertical section taken on the line 2—2 of Fig. 1; Fig. 3 is an enlarged view of the spraying device in normal position; Fig. 4 is the same as Fig. 3 only showing the spraying device in operation; Fig. 5 is a horizontal section taken on the line 5—5 of Fig. 3; and Fig. 6 is a vertical section taken on the line 6—6 of Fig. 3.

In describing my invention I shall refer to the accompanying drawings in which similar reference characters designate corresponding parts throughout the several views and in which F designates a rectangular frame having an opening 1 in its upper section and oppositely opposed holes 2 in its side sections. This frame, which acts as a supporting frame for this device, may be attached at the end of a runway, in a fence, or in any desired position such as devices of this character are adapted to be used in, as may be desired. Above the aperture 1 in the upper section of the frame F is positioned a supply tank S which holds the disinfectant, insecticide, or the like, which is used to spray the stock. Projecting upwardly through the opening 1 is a shank of a T-shaped supply pipe 3, which has its free end projecting into the supply tank spaced above the same. The head 4 of this pipe projects from either side of the frame and has its outer end portions externally screw threaded as designated by the numeral 5 for a purpose to be hereinafter more fully described.

Positioned in the rectangular frame F is a substantially inverted U-shaped gate G having an upper section 6 and side bars 7. Across the upper section of the gate, is a bar which forms an axis therefor 8, which has its extremities projecting therefrom and through elongated slots 8' into the holes 2 in the upper end of the frame F. This positioning or mounting of the gate in the frame as aforesaid, enables the gate to be hingedly and slidably mounted therein for a purpose to be hereinafter more fully described. Space blocks 9 are positioned on the bar 8 between the side bars of the gate and the sides of the frame to centrally position the gate therein.

Extending transversely between the side bars 7 are removable rods 10, the bottom one of which is adapted to be struck by the back of the hog, sheep, or like animal, when passing through the gate. Adjacent the upper end of the gate are diagonally extending brace cross bars 11 and 12, which have their outer extremities secured to the side bars of the gate and are secured at their mid-sections as shown by the numeral 13. Projecting upwardly from the upper section 6 of the gate are operating arms 14 which are secured at their lower ends to the cross bars and the upper section of said gate as shown at 14'.

Attached to the upper end of the said operating arms 14, are coil springs 15 which form a connection between said arms and valves 16 mounted on the outer ends of the head of the depending T-shaped supply pipe secured in the upper section of the frame. These coil springs 15 extend one to the rear of said frame to connect with the corresponding projecting valve 16, and the other to the front to form a connection with the corresponding forwardly projecting valve 16. These valves 16 have operating levers 17 with apertures 18 in the outer ends to which is attached the ends of the coil springs 15.

The valves 16 which are attached to the ends of the T-shaped supply pipe, comprise a substantially circular body section 19 having an internal bore therethrough, one end of said section being internally threaded whereby the said section is adapted to be securely engaged with the threads 5 at the ends of the head of the T-shaped supply pipe. The other end of said body portion 19 has extending therefrom, a yoke 20 whose outer end is raised slightly higher than the end adjacent the said body portion. A lug 21 is formed on the upper portion of body portion 19 for a purpose to be hereinafter more fully described. A valve portion 22 is composed of a substantially flat section having enlarged upper ends 23 adapted to form shoulders 24 which are fulcrumed on the upper sides of the yoke 20 adjacent the end of the body portion 19. A notch 25 is formed intermediate the enlarged shoulder 23 at the top of the said valve which is adapted to engage the lug 21 on the body portion 19 and be guided thereby when the valve is operated. A washer 26 is secured by a screw 27 to the face of the valve portion adjacent the bore through the body portion 19, and the opposite face of said valve portion has a projecting lug 28 formed thereon adapted to receive one end of a coil spring 29 positioned in the yoke between said valve portion and the outer end of said yoke to exert a constant pressure or tension upon the valve portion to normally retain the same in closed position. A lug 30 on the inner wall of the outer end of the yoke section 20 forms a securing means for the outer end of the coil spring 29. Extending upwardly from one of the enlarged shoulders 23 of the valve is an operating lever 17 having an aperture in its outer end for the purpose hereinbefore stated.

It will thus be seen that I have provided a pair of valves for a spraying device of this character which are attached to either side of the gate G, which is adapted to be operated by the animal when passing thereunder, and which valves are operated one at a time by connections between the end of a gate and the said valve in accordance with the direction which the gate is swung.

Attached to the inner surface of the side sections of the frame F adjacent the lower end of the side bars 7 of the gate G, are latching members 31 having sloping upper sides 32 and notches 33 intermediate the sides of said members. Projecting laterally from the adjacent lower end of the side bars 7 of the gate are locking or latching pins 34 having their outer ends adapted to be positioned in the notches 33 of the latching members when the gate is in normal or inoperative position to thereby hold the same to prevent any casual disengagement of the gate.

In operation when the different parts of this device are assembled as shown in Fig. 1 of the drawing, the gate G is normally positioned in inoperative position, in a plane at right-angles to the plane of the T-shaped head of the depending supply pipe 4. Furthermore, the gate is firmly held in this position by means of the pins 34 engaging the latching members 31, to hold the same whereby the gate is held against any casual disengagement, and consequent premature operation of the spraying device.

When an animal passes through the frame, the back of said animal will engage the lower transversely extending rod 10 between the side bars of the gate G, which will lift the said gate owing to the sliding engagement of the hinged bar or axis 8 of the same with the gate G as shown at 8', thereby lifting the pins 34 out of engagement with the latching members 31 and allowing the gate to be swung in either direction, for instance, as is shown in Fig. 4 of the drawings. When in this position, one of the valves 16 will be operated by the gate, owing to the connection with the same through one of the projecting arms 14, the coil spring 15, and the operating lever 17 for the valve itself. After the animal has passed through the gate, the same will be returned to its normal position by the action of the spring 15 which is expanded during the spraying operation, and consequently upon the release of the pressure which tends to hold the gate open, the said spring will be contracted and will force the gate back to its normal position as above described. The coil spring 29 of the valve 16 will also tend to return the said valve to its normally closed position and cut off any further operation of the device.

It will be noted that owing to the particular structure employed in this device, the valve which is positioned in the direction which the gate is swung, will only be operated by the same. By providing two of these valves, one on either side of the gate, I have provided a device of this character which may be easily and simply operated by the movement of the gate in either direction as has hereinbefore been particularly pointed out, and described.

From the foregoing description of the construction of my improved device, the manner of applying the same to use and the operation thereof will be readily understood and it will be seen that I have provided a simple, inexpensive and efficient means for carrying out the objects of the invention.

While I have particularly described the elements best adapted to perform the functions set forth, it is obvious that various changes in form, proportions and in the minor details of construction, may be resorted to within the scope of the appended claims without departing from the spirit or sacrificing any of the principles of this invention.

I claim:

1. A device of the character described comprising a gate, and a spraying device having valve outlets on either side of the gate singly operated by the movement of the same.

2. A device of the character described comprising a supply pipe having valved openings at either end, and a gate adapted to be swung in either direction normally positioned in a plane at right-angles to the plane of said pipe, and said gate operating the valved end of the supply pipe positioned in the direction of its movement.

3. A device of the character described comprising a frame, a gate hingedly and slidably mounted in said frame, a spraying device operated by the movement of the gate in either direction, and means for yieldably holding said gate when in central position.

4. A device of the character described comprising a frame, a gate hingedly and slidably mounted in said frame, and a spraying device having valved outlets on either side of the gate singly operated by the movement of the gate in either direction.

5. A device of the character described comprising a frame, a container, a supply pipe from the container projecting from the frame at either side, valves on the ends of said pipe, a gate hingedly and slidably mounted in said frame, and means carried by said gate to operate the valve positioned in the direction in which the gate is swung.

6. A device of the character described comprising a frame, a container, a supply pipe from the container, projecting from the frame at either side, valves on the ends of said pipe, a gate hingedly and slidably mounted in said frame, connections between said gate and valves to singly operate the latter upon movement of the gate, and locking means for said gate when in inoperative position.

7. A device of the character described comprising a frame, a container, a supply pipe from the container projecting from the frame at either side, valves on the ends of said pipe, a gate in said frame rotatably and slidably mounted on an axis adjacent the upper end of the same, arms on said gate, spring connections between the said arms and valves, and locking means for said gate when in inoperative position.

8. A device of the character described comprising a frame, a container, a supply pipe from the container projecting from the frame at either side, valves on the ends of said pipe, operating levers on said valves, a gate in said frame rotatably and slidably mounted on an axis adjacent the upper end of the same, a pair of upright arms secured at one end to said gate and having their free ends projecting therefrom, coil springs connecting the free ends of said arms and the valve operating levers, and locking means for said gate when in inoperative position.

9. A device of the character described comprising a frame, a container, a supply pipe from the container projecting from the frame at either side, valves on the ends of said pipe, a gate having an open lower end rotatably and slidably mounted on an axis in the frame, transversely extending rods removably mounted between the side bars of said gate, laterally projecting pins on the outer surface of the side bars, latch members on the adjacent sections of the frame adapted to receive said pins when the gate is in inoperative position, and connections between said gate and valves to singly operate the latter upon movement of the gate.

10. A device of the character described comprising a frame, a container, a supply pipe from said container depending from the upper section of said frame and extending from either side of the same, valves on the ends of said pipe, a swinging gate in said frame adapted to swing transversely of the same, and resilient connections between the said valves and the top of the gate to operate one of said valves upon movement of the gate and to return the gate to its initial position when released.

11. A device of the character described comprising a frame, a container, a T-shaped supply pipe having its shank depending from the upper sections of said frame and its head extending from either side of the same, yoke members on the ends of said head, spring pressed closures fulcrumed in said yoke members, operating levers on said closures, a swinging gate in said frame normally positioned in a plane at right angles to and below said pipe head, and connections between the top of said gate and the operating levers on said closures.

12. A device of the character described comprising a circular body, a yoke extending from one end thereof, a valve having enlarged projecting shoulders on its upper end fulcrumed in said yoke, and a notch formed intermediate the said shoulders, a washer on one side of said valve, a coil spring positioned between the other side and the outer end of the yoke, an operating lever projecting from one of the enlarged shoulders of said valve, and a lug formed on the adjacent upper portion of the valve body.

In testimony whereof I have hereunto set my hand in presence of two subscribing witnesses.

BERT ARMSTRONG.

Witnesses:
   RICA McKINLEY,
   WILLIS F. GRAHAM.

Copies of this patent may be obtained for five cents each, by addressing the "Commissioner of Patents, Washington, D. C."